US006836201B1

(12) United States Patent
Devenyi et al.

(10) Patent No.: US 6,836,201 B1
(45) **Date of Patent: *Dec. 28, 2004**

(54) ELECTRICALLY DRIVEN BISTABLE MECHANICAL ACTUATOR

(75) Inventors: Gabor Devenyi, Peuetang (CA); Kevin Wagner, Barrie (CA)

(73) Assignee: Raytheon Company, Waltham, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1258 days.

(21) Appl. No.: 08/566,206

(22) Filed: Dec. 1, 1995

(51) Int. Cl.[7] .............................. H01F 7/08; G03B 9/08

(52) U.S. Cl. ....................... 335/229; 335/234; 396/463; 396/468

(58) Field of Search ................................ 335/229–235; 396/463–470

(56) References Cited

U.S. PATENT DOCUMENTS 2,915,681 A * 12/1959 Troy .......................... 335/229
3,103,603 A * 9/1963 Reutter ........................ 310/30
3,728,654 A * 4/1973 Tada .......................... 335/234
4,127,835 A * 11/1978 Knutson ..................... 335/266
4,288,771 A * 9/1981 Ueda et al. ................. 335/230
4,315,197 A * 2/1982 Studer ......................... 318/135
4,419,643 A * 12/1983 Ojima et al. ................ 335/234
4,422,060 A * 12/1983 Matsumoto et al. ........ 335/256
4,755,782 A * 7/1988 Yamamoto .................. 335/230
5,434,549 A * 7/1995 Hirabayashi et al. ....... 335/229
5,470,043 A * 11/1995 Marts et al. .................. 251/65

FOREIGN PATENT DOCUMENTS

IT 633786 * 2/1962 ................ 335/234

* cited by examiner

*Primary Examiner*—Ramon M. Barrera
(74) *Attorney, Agent, or Firm*—William C. Schubert; Glenn H. Lenzen, Jr.

(57) ABSTRACT

A mechanical actuator includes an annular electromagnet and a ferromagnetic plunger disposed within a bore of the electromagnet and slidable therein. A first permanent magnet is positioned outside of the bore and in facing relation to a first end face of the plunger, and a second permanent magnet is positioned outside of the bore and in facing relation to the second end face of the plunger. The plunger is slidable in the bore between a first position with the first end face adjacent to the first permanent magnet and a second position with the second end face adjacent to the second permanent magnet. Activation of the electromagnet with the current flowing in a first direction drives the plunger toward the first permanent magnet, where it is retained. Activation of the electromagnet with the current flowing in a second (opposite) direction drives the plunger away from the first permanent magnet and toward the second permanent magnet, where it is retained.

14 Claims, 2 Drawing Sheets

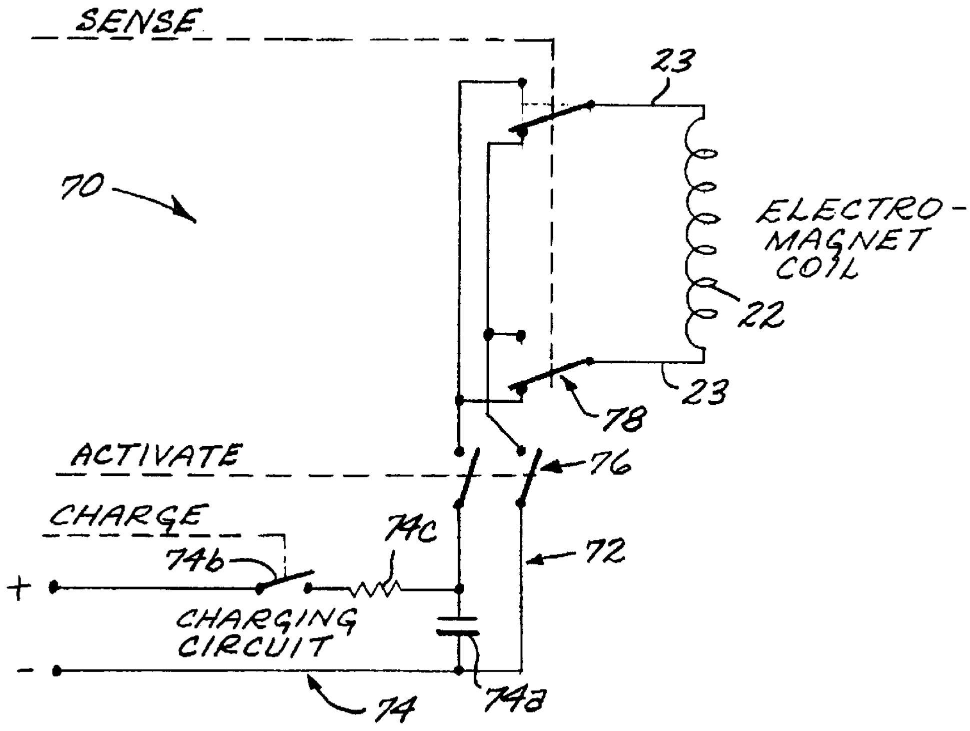
FIG. 3
FIG. 4
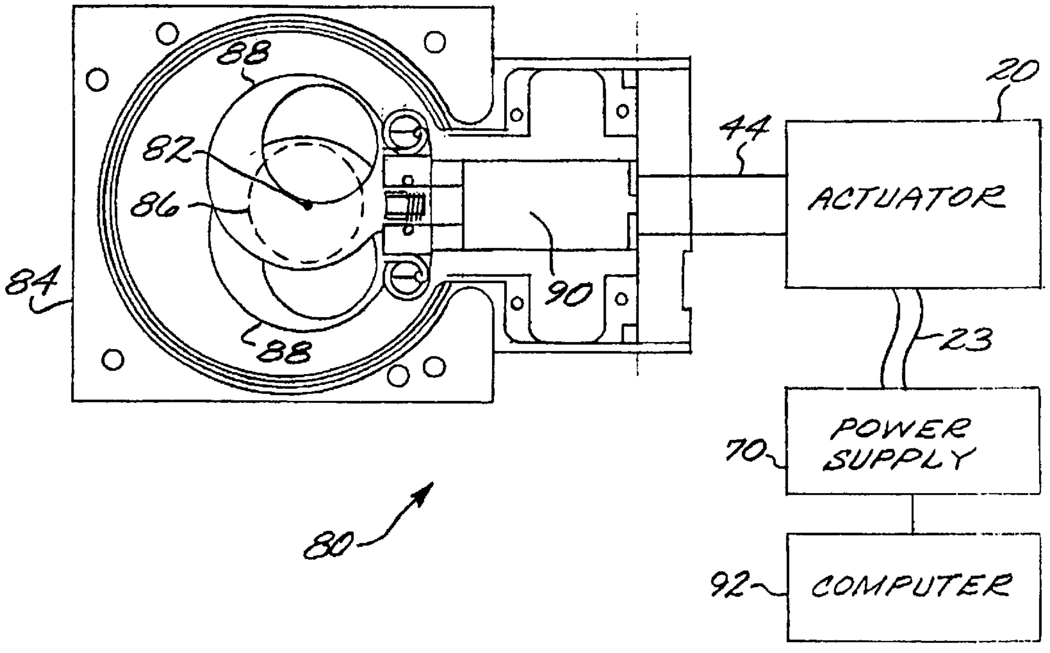

ELECTRICALLY DRIVEN BISTABLE MECHANICAL ACTUATOR

BACKGROUND OF THE INVENTION

This invention relates to a device that produces a mechanical movement, and, more particularly, to a mechanical actuator that moves between two positions and is stable in either of the two positions without the application of power.

A mechanical actuator is a device that controllably produces a mechanical movement. The mechanical actuator is typically connected to another device which requires such a movement for its proper operation. Mechanical actuators can be designed to produce linear, rotational, or other types of movements, as required.

In one application, the mechanical actuator produces movement between one of two states, without any need for controllable positioning between the two states. In an example, a mechanical shutter is either open or closed. The mechanical actuator that drives the shutter operates between one state corresponding to the closed shutter and the other state corresponding to the open shutter. An intermediate state is of no interest, and in fact it is desirable in many applications that the shutter move as rapidly as possible between the open and closed states, with little time spent in the partially open state. Another example is an electrically driven mechanical lock, such as a door or trunk lock of an automobile, where in the case of a power failure a charged capacitor bank provides an electrical impulse to open the lock. The only states of interest are the locked and unlocked conditions. In this case, it is desirable that the selected state be retained even in the absence of power.

A solenoid or other type of electromagnet-driven device is often used as a mechanical actuator operating between two states. However, such devices require the continuous application of power or the provision of a separate latching/unlatching mechanism. For some situations, the continuous power utilization is unacceptable because of the high power consumption, heat generation, or other reasons. The solenoid produces force on one direction only, and the first state is achieved using a return spring whose force must be overcome to achieve the first state. The result is that the holding forces in the two states are greatly different, and also that a considerable power consumption may be required to hold the mechanism in the first state. If power is lost, the actuator moves to the second state dictated by the operation of the return spring.

There is, accordingly, a need for an improved mechanical actuator for operation between two states. The present invention fulfills this need, and further provides related advantages.

SUMMARY OF THE INVENTION

The present invention provides a mechanical actuator that operates reliably and rapidly between two states. The actuator remains in either selected state when the driving power is removed, allowing the selected state to be retained without power consumption and heat production. The selected state is also retained through a power loss. No separate latching/unlatching mechanism is required. The force applied to retain the mechanism in the selected state can be the same for both states, or it can be made unequal. The mechanism can be made to switch between states quite rapidly.

In accordance with the invention, an actuator comprises a bipolar electromagnet and a ferromagnetic plunger disposed adjacent to the electromagnet and movable with respect to the electromagnet along an actuation axis. The plunger has a first end face and a second end face. A first permanent magnet is positioned remote from the electromagnet and in facing relation to the first end face of the plunger, and a second permanent magnet is positioned remote from the electromagnet and in facing relation to the second end face of the plunger. The plunger is slidable along the actuation axis between a first position with the first end face adjacent to the first permanent magnet and a second position with the second end face adjacent to the second permanent magnet.

In a preferred form, the actuator is cylindrically symmetric. In this form, an actuator comprises an annular bipolar electromagnet having a bore therethrough with a bore axis, and a ferromagnetic plunger disposed within the bore and slidable therein. The plunger has a first end face and a second end face. A first permanent magnet is positioned outside of the bore and in facing relation to the first end face of the plunger, and a second permanent magnet is positioned outside of the bore and in facing relation to the second end face of the plunger. The plunger is slidable in the bore between a first position with the first end face adjacent to the first permanent magnet and a second position with the second end face adjacent to the second permanent magnet.

In each case, a stop is desirably positioned between each face of the plunger and its respective permanent magnet. The stop is preferably made of an elastomer to cushion the impact of the plunger face against the permanent magnet. A push rod typically extends from one or both ends of the plunger, to provide connection to the device being actuated. The retention force in either state can be controlled by providing permanent magnets of the same or different forces, or by providing a biasing spring reacting between the electromagnet and the plunger. The entire apparatus is conveniently packed within a housing having sides and end plates, with appropriate openings in the end plates to permit pass-through of the push rods.

The actuator is operated using a bipolar power supply to energize the electromagnet. When the electromagnet is energized in the first direction, the plunger is driven toward the first permanent magnet. If the power is thereafter removed, the plunger is retained in this first position by the magnetic force of the first permanent magnet. The plunger is driven toward the second state by energizing the electromagnet in the second direction, to overcome the retention force of the first permanent magnet and to create a magnetic-induction repulsion force between the permanent magnetic field and the magnetized plunger. After reaching the second state, the plunger is retained by the force of the second permanent magnet. The retention force is controllably increased, where desired, by maintaining the energization of the electromagnet in addition to the induced permanent magnetic field in the plunger.

The present invention thus provides a non-complex, bistable mechanical actuator which retains either selected state without the continued application of power. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a schematic circuit diagram of a power supply for the bistable mechanical actuator; and FIG. 4 is a schematic diagram of an apparatus for controlling the passage of radiation utilizing the bistable mechanical actuator.

DETAILED DESCRIPTION OF THE INVENTION

Figure 1:
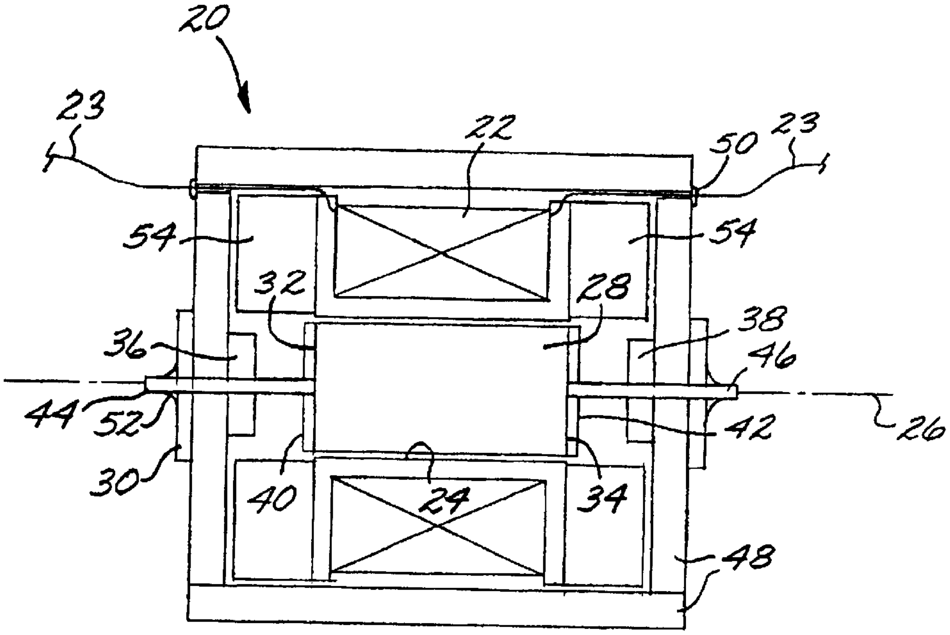
FIG. 1 is a schematic side sectional view of a first embodiment of a bistable mechanical actuator.

FIG. 1 depicts in a preferred embodiment an electrically driven bistable mechanical actuator 20. The actuator 20 includes an electromagnet 22 wound as a cylindrically symmetric annulus having a bore 24 therethrough. The electromagnet 22 comprises an electrically conductive winding, such as a wire, upon a bobbin. A pair of leads 23 for the windings of the electromagnet 22 extend therefrom. The bore 24 is defined by a bore axis 26. Disposed within the bore 24 is a plunger 28 made of a ferromagnetic material such as iron. The plunger 28 is slidable within the bore 24 along the bore axis 26. To aid in the sliding movement, the plunger 28 is typically supported on a set of bearings 30. The plunger has a first end face 32 lying generally perpendicular to the bore axis 26 and a second, oppositely disposed, end face 34 lying generally perpendicular to the bore axis 26.

A first permanent magnet 36 is positioned outside of the bore 24 and in a generally facing, but spaced apart, relation to the first end face 32. A second permanent magnet 38 is positioned outside of the bore 24 and in a generally facing, but spaced apart, relation to the second end face 34. The extent of the sliding movement of the plunger 28 is such that the plunger is slidable between a first position with the first end face 32 adjacent to the first permanent magnet 38 and a second position with the second end face 34 adjacent to the second permanent magnet 38.

To prevent damage by impact of the plunger 28 against the permanent magnets, there is desirably provided a first stop 40 between the first end face 32 and the first permanent magnet 36, and a second end stop 42 between the second end face 34 and the second permanent magnet 38. The stops 40 and 42 are preferably made of elastomeric material such as rubber. The stops, 40 and 42 are preferably provided in the form of pads affixed to the first end face 32 and the second end face 34, respectively. The thicknesses of the stops 40 and 42 are selected in conjunction with the strengths chosen for the respective first permanent magnet 36 and second permanent magnet 38, such that the fields of the permanent magnets can extend through the stops to react with the ferromagnetic material of the plunger 28 to exert a sufficient retention force on the plunger 28. Additionally, the impact of the plunger 28 against the end stop can be controlled, if needed, by a short pulse of reversed current into the electromagnet 22 just before the plunger 28 reaches the end stop 40 or 42.

A first push rod 44 extends from the first end face 32 of the plunger 28 to a location external to the actuator 20. Optionally, a second push rod 46 extends from the second end face 34 of the plunger 28, to a location external to the actuator 20, but in a direction opposite to the first push rod 44. The push rods 44 and 46 provide the external mechanical connection to the actuator 20, and can serve to provide actuation at one end of the device or at both ends.

A housing 48 surrounds the electromagnet 22, the plunger 28, and the permanent magnets 36 and 38. The permanent magnets 36 and 38 are desirably affixed to the interior of the ends of the housing 48, with openings therein through which the push rods pass. The leads 23 extend out of the housing 48 for external connection to a power supply. The push rod 44 and the push rod 46, where provided, extend through openings in the housing 48. A seal 50 to the housing for each of the leads 23 and a seal 52 to the housing for each of the push rods 44, 46 is preferably provided, to prevent intrusion of contaminants and corrosive agents from the exterior of the actuator 20 into its interior. Nonmagnetic spacers 54 are used to retain the electromagnet 22 securely in position within the housing 48.

In operation of the actuator 20, activation of the electromagnet 22 with a first polarity produces a magnetic field within the bore 24. The ferromagnetic material of the plunger 28 reacts with the magnetic field produced by the electromagnet 22 to drive the plunger 28 toward the first permanent magnet 36, toward the left in the view of FIG. 1. The movement of the plunger 28 is halted by the contact of the first stop 40 to the first permanent magnet 36. The reaction of the ferromagnetic material of the plunger 28 with the magnetic field produced by the first permanent magnet 36 produces a retention force that holds the plunger 28 in close proximity to the first permanent magnet 36. That is, the plunger 28 contacts the first permanent magnet 36, but for the intervention of the first stop 40.

The plunger 28 is retained to the first permanent magnet 36 even after the current to the electromagnet 22 is turned off. Thus, the plunger 28 is held in this first position even after the electromagnet 22 is no longer operational either because the power is intentionally turned off to conserve power or to reduce heat production, or the power is unintentionally discontinued due to a power failure.

To drive the plunger 28 in the opposite direction, the polarity of the electromagnetic field is reversed by running the energizing current in the opposite direction through the electromagnet 22. The oppositely directed force overcomes the force between the first permanent magnet 36 and the plunger 28, and drives the plunger 28 to the opposite end of its travel so that the plunger 28 reacts with the magnetic field of the second permanent magnet 38 and is retained there. The second stop 42 acts in the same manner as the first stop 40, to cushion the impact and contact between the plunger 28 and the second permanent magnet 38. The plunger 28 is retained in this second position until forced from it by actuation of the electromagnet in the reversed polarity (i.e., back to the polarity that drives the plunger toward the first permanent magnet).

The movement between the first and second positions occurs rapidly and in a bistable manner. That is, the only mechanically stable points in the system are the two positions with the end faces 32, 34 in proximity to their respective permanent magnets 36, 38. There are no intermediate stable points.

Figure 2:
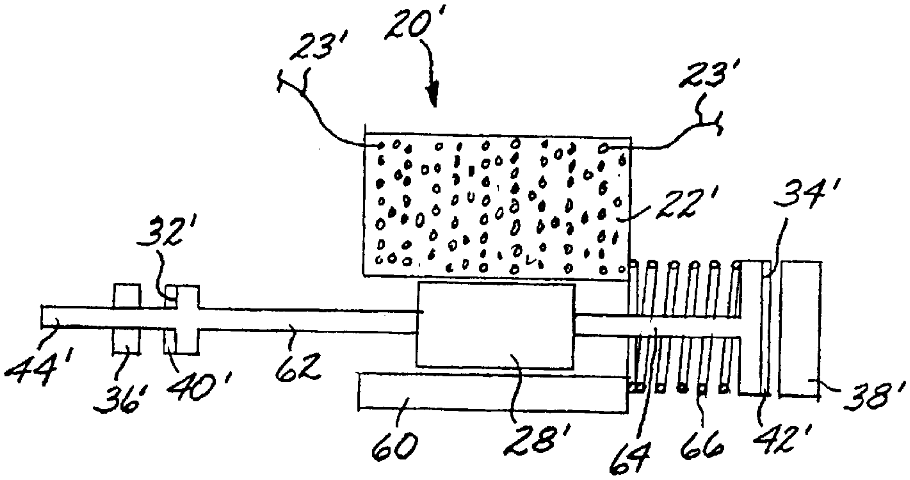
FIG. 2 is a schematic side sectional view of a second embodiment of the bistable mechanical actuator.

FIG. 1 is a preferred embodiment, and the invention is not limited to this preferred embodiment. FIG. 2 illustrates another form of the actuator 20'. The actuator 20' utilizes alternative forms of the elements discussed in relation to FIG. 1, indicated with the same numerals as in FIG. 1 but with primes (') added, and some additional elements. The description of the elements in relation to FIG. 1 is incorporated here, with changes and modifications discussed next. In FIG. 2, the housing is omitted for clarity. The electromagnet 22' is not cylindrically symmetric, and is of a flat form. The plunger 28' is of ferromagnetic construction, but is shaped to lie adjacent to the side of the electromagnet 22'. The plunger 28' rides on a sliding support 60, such as rails, rather than bearings. The first end face 32' and the second end face 34' of the plunger 28' are positioned at the end of respective extensions 62 and 64 of the plunger 28', so that the first permanent magnet 36' and the second permanent magnet 38' are positioned at a distance from the electromagnet 22'. In the embodiment of FIG. 2, there is only a first push rod 44', and no counterpart to the second push rod of FIG. 1.

The retention forces at the first and second positions of the plunger can be the same or different from each other. FIG. 2 illustrates two techniques for varying the mechanical response of the actuator and the retention force. In the first, a coil spring 66 reacts between the plunger 28' and the electromagnet 22', to bias the plunger 28' toward the second permanent magnet 38'. The coil spring 66 could also be reversed to bias the plunger toward the first permanent magnet. Secondly, the permanent magnets can be provided with different magnetic strengths by any suitable technique. In one such technique, the second permanent magnet 38' and the second end face 34' are made physically larger than the first permanent magnet 36' and the first end face 32', so that a greater retention force is produced by the attraction of the second permanent magnet 38' and the second end face 34'. In another approach, the two permanent magnets can be made of different magnetic strengths. These techniques are used when it is desired that the actuator 20' perform in a bistable, but asymmetric, manner for a particular application. These various techniques can be used as desired in conjunction with the preferred actuator of FIG. 1, to the extent that they are not incompatible with the operation of the actuator of FIG. 1.

FIG. 3 illustrates in schematic form a bipolar electrical power supply 70 useful in driving the actuator 20 or actuator 20'. The power supply includes a direct current power source 72, which could be, for example, a battery, a DC power supply or, as illustrated, a capacitor system 74 which, when discharged through the electromagnet 22, provides a high pulse of power. The capacitor system 74 includes a capacitor 74a that can be controllably discharged across the electromagnet coil 22. The capacitor 74*a* is charged through an external charging circuit that includes a charging control switch 74*b* and a resistor 74*c* selected to limit the charging current and minimize the charging time. An activation switch 76 connects the power source 72 to the electromagnet 22. A sense switch 78 serves to reverse the polarity of the current flowing through the coil of the electromagnet 22, thereby controlling the direction of movement of the plunger 28 in the manner discussed previously. The switches 76 and 78 can be operated manually or by a controller such as a computer that coordinates the operation of the actuator 20 with the operation of the system which is being mechanically actuated.

In operation, the DC power supply 70 is activated to drive the plunger 28 to either bistable position. The power supply 70 may thereafter be disconnected, so that the magnetic force of the permanent magnets retains the plunger 28 in the state to which it was driven. The power supply 70 is reversed in polarity and activated to drive the plunger to the opposite state. In another mode of operation, the power supply 70 may be continued in operation to add the electromagnetic driving force to the force of the permanent magnet to increase the retention force in one of the bistable states beyond that possible with only the operative permanent magnet. In the case of the illustrated capacitor power supply, if additional holding force is required at either of the bistable states of the plunger, the line charge can be modulated or the resistor value of resistor 74*c* selected to limit the current flow. This augmented-retention force mode may be used, for example, when the system is subjected to a large shock load which might otherwise dislodge the plunger 28 from its retained state. The added retention force of the electromagnet prevents the dislodging.

FIG. 4 illustrates one example of the use of the actuator 20, in this case in an apparatus 80 for controlling the passage of a beam 82 of radiation (the beam being directed out of the plane of the figure). A shutter unit 84 is positioned with an aperture 86 overlying the path of the beam 82. A pair of shutter plates 88 are mounted to a shutter arm 90. The shutter plates 88 are pivotably mounted to the frame of the shutter unit 84 so that the shutter plates 88 can swing between two positions, one wherein the shutter plates 88 block the aperture 86 and the other where the shutter plates do not block the aperture 86. The actuator 20 and its associated power supply 70 are positioned such that the first push rod 44 extending from the actuator 20 mechanically connects to the shutter arm 90. The length of the push rod 44 and the shutter arm 90 are adjusted so that the shutter plates 88 block the aperture 86 when the actuator 20 is in its first state and the shutter plates 88 do not block the aperture 86 when the actuator 20 is in its second state. In this case, the operation of the actuator, and thence the shutter unit, is typically controlled by a computer 92 that controls the power supply 70, thereby coordinating the operation of the apparatus 80 with a larger optical system of which the apparatus 80 is a part.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An actuator, comprising:

an annular electromagnet having a bore therethrough with a bore axis;

a ferromagnetic plunger disposed within the bore and slidable therein parallel to the bore axis, the plunger having a first end face and a second end face;

a first permanent magnet positioned outside of the bore and in facing relation to the first end face of the plunger along the bore axis, the first permanent magnet attracting the plunger thereto;

a second permanent magnet positioned outside of the bore and in facing relation to the second end face of the plunger along the bore axis, the second permanent magnet attracting the plunger thereto, the plunger being slidable in the bore between a first position with the first end face adjacent to the first permanent magnet and a second position with the second end face adjacent to the second permanent magnet; and a bipolar electrical DC power supply operatively connected to the electromagnet through a sense switch, whereby a polarity of the electromagnet may be reversed by operation of the sense switch, the plunger being retained adjacent to one of the permanent magnets when the electromagnet is not energized.

2. The actuator of claim 1, further including a first stop positioned between the first permanent magnet and the first end face, and a second stop positioned between the second permanent magnet and the second end face.

3. The actuator of claim 2, wherein each of the first stop and the second stop is made of an elastomer.

4. The actuator of claim 1, further including a first push rod extending from the first end of the plunger in a direction parallel to the bore axis.

5. The actuator of claim 4, further including a second push rod extending from the second end of the plunger in a direction parallel to the bore axis.

6. The actuator of claim 1, further including a housing around the electromagnet, the plunger, the first permanent magnet, and the second permanent magnet.

7. The actuator of claim 1, wherein the power supply comprises:

a capacitor having a capacitor output, a source of electrical current controllably connected to the capacitor, and a switch receiving as an input the capacitor output, and having as an output a connection to a winding of the electromagnet.

8. Apparatus for controlling the passage of radiation, comprising:

a shutter unit including a linearly actuated shutter arm;

a linear actuator comprising an electromagnet, ferromagnetic plunger disposed adjacent to the electromagnet and movable with respect to the electromagnet along an actuation axis, the plunger having a first end face and a second end face, a first permanent magnet positioned remote from the electromagnet and in facing relation to the first end face of the plunger along the actuation axis, the first permanent magnet attracting the plunger thereto, and a second permanent magnet positioned remote from the electromagnet and in facing relation to the second end face of the plunger along the actuation axis, the second permanent magnet attracting the plunger thereto, the plunger being slidable along the actuation axis between a first position with the first end face adjacent to the first permanent magnet and a second position with the second end face adjacent to the second permanent magnet, the plunger being retained adjacent to one of the permanent magnets when the electromagnet is not energized;

a bipolar electrical DC power supply operatively connected to the electromagnet; and a push rod mechanically connecting the plunger to the shutter arm.

9. The apparatus of claim 8, wherein the electromagnet is cylindrically symmetric.

10. The apparatus of claim 8, wherein the electromagnet is annular having a bore therethrough with a bore axis, and wherein the plunger is disposed within the bore and slidable therein.

11. The apparatus of claim 8, further including a housing around the electromagnet, the plunger, the first permanent magnet, and the second permanent magnet.

12. The actuator of claim 8, wherein the power supply comprises:

a capacitor having a capacitor output, a source of electrical current controllably connected to the capacitor, and a switch receiving as an input the capacitor output, and having as an output a connection to a winding of the electromagnet.

13. The apparatus of claim 8, further including a first stop positioned between the first permanent magnet and the first end face, and a second stop positioned between the second permanent magnet and the second end face.

14. The actuator of claim 13, wherein each of the first stop and the second stop is made of an elastomer.

* * * * *